(12) United States Patent
Jellison, Jr. et al.

(10) Patent No.: US 10,976,987 B2
(45) Date of Patent: Apr. 13, 2021

(54) GRAPHICAL USER INTERFACE FOR CONTENT MANAGEMENT

(71) Applicant: iHeartMedia Management Services, Inc., San Antonio, TX (US)

(72) Inventors: David C. Jellison, Jr., Ogallala, NE (US); Koushik Kannan, Ogallala, NE (US); Dwight Douglas, White Plains, NY (US)

(73) Assignee: HeartMedia Management Services, Inc., San Antonio, TX (US)

( * ) Notice: Subject to any disclaimer, the term of this patent is extended or adjusted under 35 U.S.C. 154(b) by 535 days.

(21) Appl. No.: 15/256,961

(22) Filed: Sep. 6, 2016

(65) Prior Publication Data
US 2016/0371053 A1    Dec. 22, 2016

Related U.S. Application Data

(63) Continuation of application No. 12/571,831, filed on Oct. 1, 2009, now Pat. No. 9,442,690.

(51) Int. Cl.
*G06F 3/0482* (2013.01)
*G06F 3/16* (2006.01)
(Continued)

(52) U.S. Cl.
CPC ............ *G06F 3/165* (2013.01); *G06F 3/0481* (2013.01); *G06F 3/0482* (2013.01);
(Continued)

(58) Field of Classification Search
CPC .... H04N 5/50; H04N 21/485; H04N 21/4383; H04N 21/64; H04H 20/22; H04L 12/18;
(Continued)

(56) References Cited

U.S. PATENT DOCUMENTS

| | | | | |
|---|---|---|---|---|
| 2004/0056837 | A1* | 3/2004 | Koga | G06F 1/16 345/156 |
| 2006/0268667 | A1* | 11/2006 | Jellison, Jr. | G11B 27/034 369/30.08 |

(Continued)

OTHER PUBLICATIONS

Broadcast Equipment Guide, B.E. Introduces new digital automation platform for radio at 2008 broadcast asia show, Jun. 18, 2008, Broadcast Industry News.
(Continued)

*Primary Examiner* — Rinna Yi
(74) *Attorney, Agent, or Firm* — Garlick & Markison; Edward J. Marshall

(57) ABSTRACT

A Graphical User Interface (GUI) allows a user to control multiple media streams at the same time. A user can display and configure multiple regions of the GUI to display information about, and control broadcast properties of, multiple media streams being broadcast at the same time. Multiple display regions of the same type can be displayed at the same time. The GUI is also highly customizable, allowing a user to configure multiple different display regions, each displaying information and controls useful for performing functions related to the type of display region. The information displayed in each region can be selected from a single media stream, or from different media streams.

15 Claims, 7 Drawing Sheets

(51) Int. Cl.
*G06F 3/0481* (2013.01)
*G06Q 10/10* (2012.01)
*G11B 27/038* (2006.01)
*G11B 27/10* (2006.01)
*G11B 27/34* (2006.01)
*H04H 60/06* (2008.01)
*G06F 3/0484* (2013.01)
*G06F 3/0489* (2013.01)

(52) U.S. Cl.
CPC ........ *G06F 3/0489* (2013.01); *G06F 3/04847* (2013.01); *G06F 3/16* (2013.01); *G06Q 10/101* (2013.01); *G11B 27/038* (2013.01); *G11B 27/105* (2013.01); *G11B 27/34* (2013.01); *H04H 60/06* (2013.01); *G06F 2203/04803* (2013.01)

(58) Field of Classification Search
CPC ......... H04L 29/06455; H04L 29/06027; H04L 29/12009; H04L 49/201
See application file for complete search history.

(56) References Cited

U.S. PATENT DOCUMENTS

2007/0157261 A1* 7/2007 Steelberg ............... H04H 60/04
                                                              725/87
2009/0249206 A1* 10/2009 Stahlberg ............... G11B 27/34
                                                              715/716

OTHER PUBLICATIONS

Digital Automation Platform, Audiovault V-Flex, Nov. 9, 2008, Radio.
Gromkov's Software (published on Dec. 27, 2008) http://web.archive.org/web/20081227073044/http://www.gromkov.com/help/advanced/avs_audio_tools/record_music_internet.htm Sam Broadcaster Guide Uploaded Date Screenshot.
Handbook on Radio Automation, Prometheus Radio Project, 34 pages, KDRT-LP, 2008.
Hot Jingle Player 1.2 (publised on May 27, 2008) http://hot-jingle-player.softpile.com.
How to play music in sam broadcaster (Uploaded on Feb 25, 2009) http://www.youtube.com/watch?v=Bzza70obtbk.
MediaTouch Radio Automation Broadcast Software, Https://www.youtube.com/watch?v=jbkrbY6tKFY, uploaded May 27, 2009.
Jeff Smith, Radio Automation, Radio Magazine, May 1, 2006, 13 pgs, radiomagonline.com.
OAS Playout, Audio Control and Management, http://www.onasticksoftware.co.uk/about-2.html, Jan. 2, 2008.
Player 101 (published on Nov. 16, 2008) http:l/web.archive.org/web/200811161321 OO/http://www.rcsworks.com/en/products/player1 01.
Sam Broadcaster Guide (published on Feb. 3, 2008) http://www.scribd.com/doc/2030955/Sam-Broadcaster-Guide.
Shoutcast Setup (published in 2007) http://www.projectxshoutcast.com/sam.html.
Station Playlist (published on Jan. 20, 2009) https://web.archive.org/web/20090120131453/http://stationplaylist.com/studio.html.
StationPlaylist Studio, Radio Playout Software, 11 pgs, web.archive.org, Jun. 28, 2015.
Stream to SHOUTcast using SAM Broadcaster (Uploaded on Dec 15, 2008) http://www.youtube.com/watch?v=prs2oMVxYMO.
Welcome to iMediaTouch Voice Tracking, Voice Tracking User Manual, 2008, CMT Technologies Inc.
WireReady (published on Jan. 7, 2007) http://web.archive.org/web/200701 07011704/http://www.wireready.com/controlready2/controlready.php.
XStudio Radio Automation System (published on Nov. 21, 2008) https://web.archive.org/web/20081121223659/http://www.dcstools.com/Products/Prod_XStudio.html.
SAM Broadcaster Overview (uploaded on Nov. 12, 2008) http://www.youtube.com/watch?v=Au8N2CkJj84.

* cited by examiner

| Airtime | | | Event | | Status | | Skip |
|---|---|---|---|---|---|---|---|
| 2:56:00 PM | 565 | | Meeting Across the River | Bruce Springsteen | 02:47 | | ☐ |
| 2:59:19 PM | | | Move Over | Steppenwolf | 00:19/02:47 | ▲ | ☐ |
| 3:00:00 PM | | | TO=3:00:00 PM | | 03:30 | ● | ☐ |
| 3:02:07 PM | | | Born To Be Wild | Steppenwolf | 00:03 | ● | ☐ |
| 3:05:37 PM | | | FINAL EXPANDABLE Ver 1 | | 02:23 | ● | ☐ |
| 3:05:41 PM | | | Little Wing | Jimi Hendrix | 00:05 | ● | ☐ |
| 3:08:05 PM | | | FINAL FROM AQUIRA TO ZETTA | | 00:09 | ● | ☐ |
| 3:08:11 PM | | | FINAL SHINY HAPPY PEOPLE | | 00:05 | ● | ☐ |
| 3:08:20 PM | | | FINAL DYNAMICALLY DIFFERENT | | 03:01 | ● | ☐ |
| 3:08:26 PM | | | Night | Bruce Springsteen | 06:51 | ● | ☐ |
| 3:11:27 PM | | | In The Evening | Led Zeppelin | 04:14 | ● | ☐ |
| 3:18:19 PM | | | Black Country Woman | Led Zeppelin | 00:05 | ● | ☐ |
| 3:22:33 PM | | | FINAL DIGITAL DISTRIBUTION | STATION PROMOTIONS | 02:23 | ● | ☐ |
| 3:22:39 PM | | | Little Wing | Jimi Hendrix | | ● | ☐ |
| 3:25:03 PM | | | EXACT_Time_Marker-Soft 3:25:03 PM | | | | |

FIG. 5

GRAPHICAL USER INTERFACE FOR CONTENT MANAGEMENT

CROSS-REFERENCE TO RELATED APPLICATIONS

The present U.S. Utility Patent Application claims priority pursuant to 35 U.S.C. § 120 as a continuation of U.S. Utility application Ser. No. 12/571,831 entitled "Graphical User Interface for Content Management," filed Oct. 1, 2009, which is hereby incorporated herein by reference in its entirety and made part of the present U.S. Utility Patent Application for all purposes.

FIELD

The present disclosure relates generally to graphical user interfaces, and more particularly to graphical user interfaces used to manage broadcast content.

BACKGROUND

Radio automation software typically uses a graphical user interface (GUI) as a front end, to receive user input and facilitate user interaction with the software. But currently available GUIs can be relatively complex to operate, and still not provide all of the functionality a user might desire.

For example, currently available GUIs used in conjunction with radio automation software limit control options available to a user—generally displaying information for controlling the broadcast content of only a single station. Additionally, the types of information displayable in one section of a GUI may be limited by information displayed in other sections. For these and other reasons, currently available GUIs are less than perfect.

SUMMARY

A Graphical User Interface (GUI) for use with broadcast automation software is disclosed herein. The GUI can be used to allow a user to control multiple play streams at the same time. A user can click on, or otherwise activate, an icon, button, hot-click region, or other user selectable object to display multiple display regions. Each of the display regions can be configured to display information from the same media play stream, or from different media streams being played, streamed, multicast, or otherwise, broadcast at the same time. In some embodiments, multiple display regions of the same type can be displayed at the same time, allowing a user to view and control multiple play streams of multiple different broadcast stations at the same time.

Furthermore, a GUI according to various embodiments is also highly customizable, allowing a user to configure multiple different display regions to display information related to media in multiple different formats, with multiple different associated controls. So, for example, a GUI can display a library region, a Hotkeys region and two station log regions—each displaying information and controls useful for performing functions related to the type of display region. The GUI can be configured to display information related to the same play stream, or different play streams, in each of the different areas.

In various embodiments, a GUI includes multiple display regions configurable to display information and playback controls associated with multiple different media streams being contemporaneously aired. The GUI can include a first display region to display a first media identifier associated with a first media item included in one of the media streams, and a user selectable control to affect playback of the first media item. In some embodiments, the GUI also includes a second display region to display, concurrently with the first media identifier, a second media identifier associated with a second media item included another one of the media streams, and a user selectable control to affect playback of the second media item.

In various embodiments, the GUI includes at least two functionally duplicate display regions, each of the functionally duplicate display regions displaying duplicate categories of information and including duplicate user selectable controls. Each of the functionally duplicate display regions can display information from a different media stream being currently aired.

A GUI can also display various user selectable objects in the first display region, or in other display regions. For example, a user selectable object operable to select among an automatic mode, a manual mode, and a live assist mode of operation can be displayed. One or more user selectable play controls can also be displayed close by the first media identifier. These play controls can be configured to be operable in the live assist mode to control whether individual media items are to be started automatically.

One or more of the GUI's display regions can be configurable to display a visual representation of a first audio program included in at least one of the plurality of media streams, and includes a user selectable control operable to receive user input establishing at least one fade point of the first audio program.

In some embodiments, a GUI displays a user selectable object operable to assign each of the plurality of audio playback streams to separate audio outputs in response to selection by a user. The GUI can also include a display area configured to display content stored in an audio library, a user selectable object operable to import audio files of different formats directly into a media library, and a user selectable object operable to export information associated with a media stream to a designated network address.

A GUI according to various embodiments can also include a hotkey display region including a plurality of user selectable objects capable of being independently configured to execute different user-assigned actions related to playback of a broadcast media stream, and a user selectable object operable to fire an event not already programmed into a station log.

Various other user selectable objects used to display a plurality of different regions in response to being selected by a user can also be displayed: a log display region including a collection of content identifiers associated with a selected station and multiple air-time indicators, each air time indicator associated with one of the content identifiers; a player display region including multiple players, with each Player displaying metadata pertaining to a media asset and a plurality of play controls associated with the media asset; and a stack display region operable to display at least one media event associated with a selected channel.

Various embodiments can be implemented as a computer readable medium tangibly embodying a program of instructions implementing the various GUIs disclosed herein. Yet other embodiments can be implemented as methods for use with broadcast automation software.

BRIEF DESCRIPTION OF THE DRAWINGS

Aspects of this disclosure will become apparent upon reading the following detailed description and upon reference to the accompanying drawings, in which like references may indicate similar elements:

FIG. 5 is a diagram illustrating a Logs display region according to embodiments of the present disclosure;

DETAILED DESCRIPTION

Figure 1:
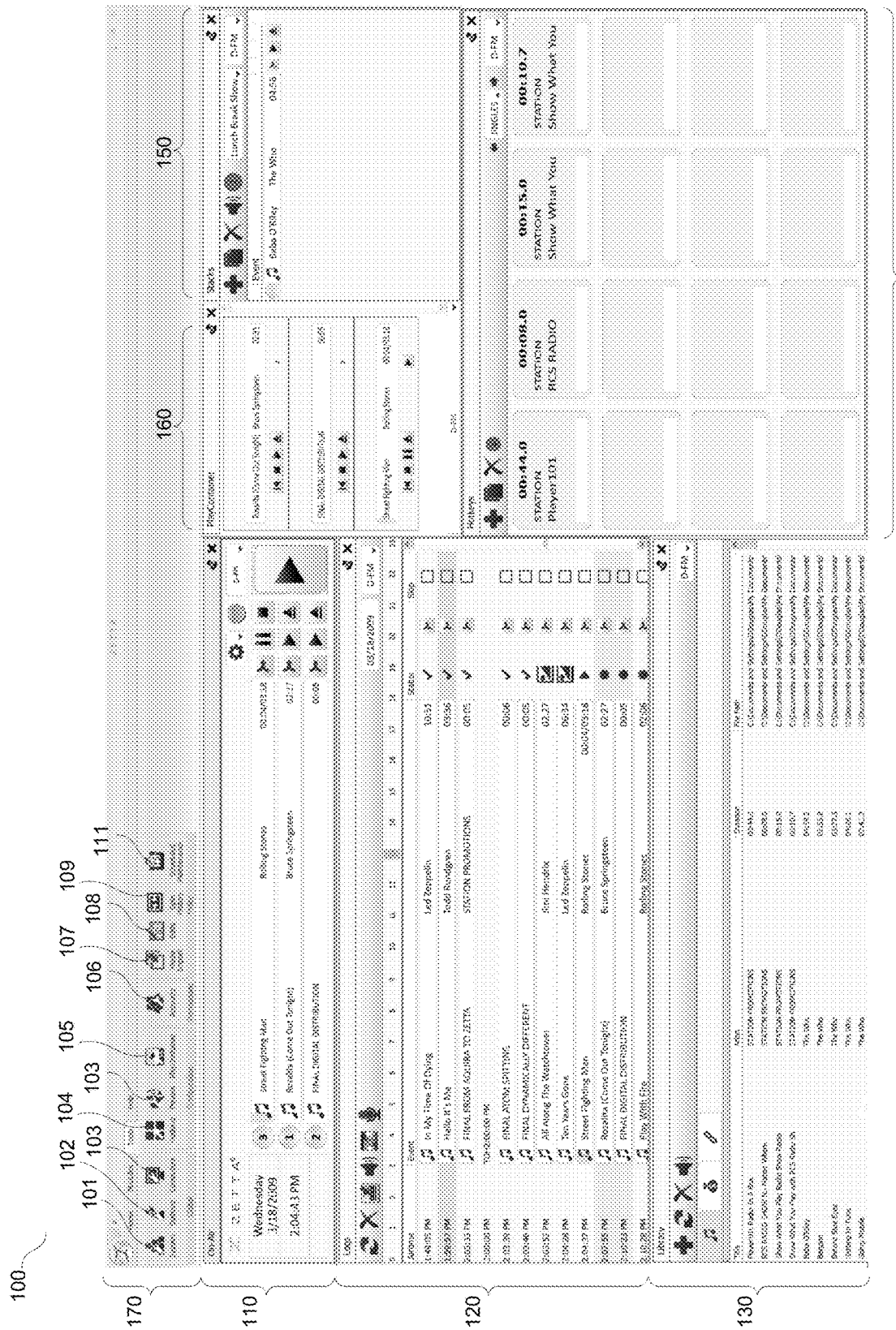
FIG. 1 is a diagram illustrating a graphical user interface (GUI) according to various embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The term media stream, as used herein, generally refers to a collection of media items that are broadcast, aired, or otherwise delivered to one or more potential recipients via media delivery channels including, but not limited to, computer networks such as the Internet, radio, television, cellular, wireless telephone, and satellite. Media items included in a media stream can include audio and video content such as songs, video clips, movies, advertisements, pre-recorded announcements, station identifiers, or other items to be broadcast or aired via any of various media delivery channels.

The term station, as used herein, is intended to broadly include content broadcast on a particular frequency or channel, e.g. conventional television, AM, FM, cable, and satellite radio or television providers; and content that can be selected by means other than frequency, e.g., Internet multicasting and streaming radio stations, and other similar media distribution channels.

The phrase "user selectable object" is used herein to refer to various items that can be displayed on a graphical user interface (GUI) to obtain user input. User selectable objects include, but are not limited to, buttons, icons, text, pictures, hotspots, menus, fillable fields, hyperlinks and similar objects, regions and areas, that are selectable by using generally available pointing devices such as a mouse, trackball, touch screen, or joystick to position a cursor or other indicator over, near, under, around, or in their general proximity. User selectable objects can also be selected by pressing a combination or series of one or more keys on a keyboard or other input device. Generally, but not always, a user selectable object is highlighted, flashes, disappears, appears, or otherwise signals to a user that the object is, has, or is about to be, selected.

Selection of a user selectable object sometimes includes a two-step process, where the user selectable object is preselected, for example by using a mouse to position a cursor over an object and then pressing a mouse button, or by pressing a combination or sequence of keys on a keyboard and then pressing the Enter key. In cases where a two-step process is used, a single term "selecting" is commonly used to refer to the complete process of preselecting an object, e.g. by positioning a cursor over the object, and then activating the object to initiate a task, e.g. by clicking on the object. The term "selecting," and its variants, is generally intended to include both a single step and multi-step processes. Those skilled in the art are familiar with the general terminology, and with initiating actions based on selecting a user selectable object.

Referring first to FIG. 1, a graphical user interface (GUI) 100 is illustrated, and discussed according to various embodiments of the present disclosure. GUI 100 includes multiple display regions, including Ribbon Navigation region 170, On-Air region 110, Logs region 120, Library region 130, Player region 160, Stacks region 150, and Hotkeys region 140. In some embodiments, each of the various regions displayed is configurable to allow a user to customize GUI 100 to better meet the user's individual needs.

In some embodiments, in addition to the display regions being individually configurable, GUI 100 provides a user the ability to configure which of the display regions are displayed in the first place. Thus, GUI 100 can be configured to display, for example, multiple instances of On-Air region 110 and Play Container region 160, but not to display Stacks region 150. Or, GUI 100 could be configured to display multiple instances of Library region 130, but not include any instance of On-Air region 110 or Logs region 120.

In some embodiments, users can configure GUI 100 using user selectable objects displayed in Ribbon Navigation region 170. As illustrated, Ribbon Navigation region 170 has the Tools area open, which causes Ribbon Navigation region 170 to include such tools as: System icon 101, Stations icon 102, Computers icon 103, Hotkeys icon 104, Players icon 103, Play Container icon 105, Accounts icon 106, Media Import icon 107, Edits icon 108, History icon 109, and Scheduled Maintenance icon 111. The icons displayed in Ribbon Navigation region 170 can be grouped into various categories, and displayed based on that grouping. For example, Hotkeys icon 104, Players icon 103, and Play Container icon 105 can be displayed as members of a Configuration group, and System icon 101, Stations icon 102, and Computers icon 103 can be displayed as part of a Global group.

The groupings can themselves be grouped into tabs or other arrangements for display. For example, the groupings to which System icon 101, Stations icon 102, Computers icon 103, Hotkeys icon 104, Players icon 103, Play Container icon 105, Accounts icon 106, Media Import icon 107, Edits icon 108, History icon 109, and Scheduled Maintenance icon 111 belong are displayed as sub-groups of a larger grouping displayed under the Tools tab. It should be appreciated that different user selectable objects can be displayed when other tabs are selected. For example, if the Modules tab is selected, user selectable objects belonging to a group called Modules can be displayed (not illustrated). It should also be noted that access to, and in some cases visibility of icons and whole tabs is controlled by a user rights system.

In some embodiments, the configurability of GUI 100 extends beyond simply allowing a user to configure which regions to display, and the ability to customize how information is presented within the individual regions. GUI 100 also permits users to choose the source of the information displayed in a particular region, and to allow information from different sources to be displayed at the same time. So, for example, On-Air region 110 can be configured to display information related to a particular broadcast channel, media stream, or the like, at the same time Logs region 120 is displaying information related to a different broadcast channel or media stream.

In some embodiments, On-Air region 110, Logs region 120, Library region 130, Hotkeys region 140, Player region 160, and Stacks region 150 can each be configured to display information related to different media streams being currently broadcast. Thus, On-Air region 110 can display information about the next three songs to be broadcast on one Internet radio station, while Logs regions 120 displays a station log for a different Internet station. At the same time, Library region 130 can be used to display the songs, advertisements, and other media content of a third Internet radio station, while Hotkeys region 140 displays hotkeys which, when selected, will initiate the broadcast of a media item on yet a fourth Internet radio station. Player region 160 can be used to display media identifiers and play controls for media currently airing or about to air on an AM radio station, while Stacks region 150 displays a song on an FM radio station.

In at least one embodiment, GUI 100 is configurable to display duplicate region types. That is to say, a user can configure GUI 100 to display two or more regions of the same type. However, the duplicate region types do not necessarily have to display the same content. Consider a case where a user configures GUI 100 to display two instances of On-Air region 110. The first instance of On-Air region 110 can be used to display information associated with a first media stream, and the second instance of On-Air region 110 can be used to display information about a second, different media stream.

Providing users the ability to configure which display regions are presented on GUI 100 at any one time, and further providing the ability to display information for multiple different media stations currently broadcasting different media streams, permits a single user the ability to control multiple different broadcasting stations concurrently.

Figure 2:
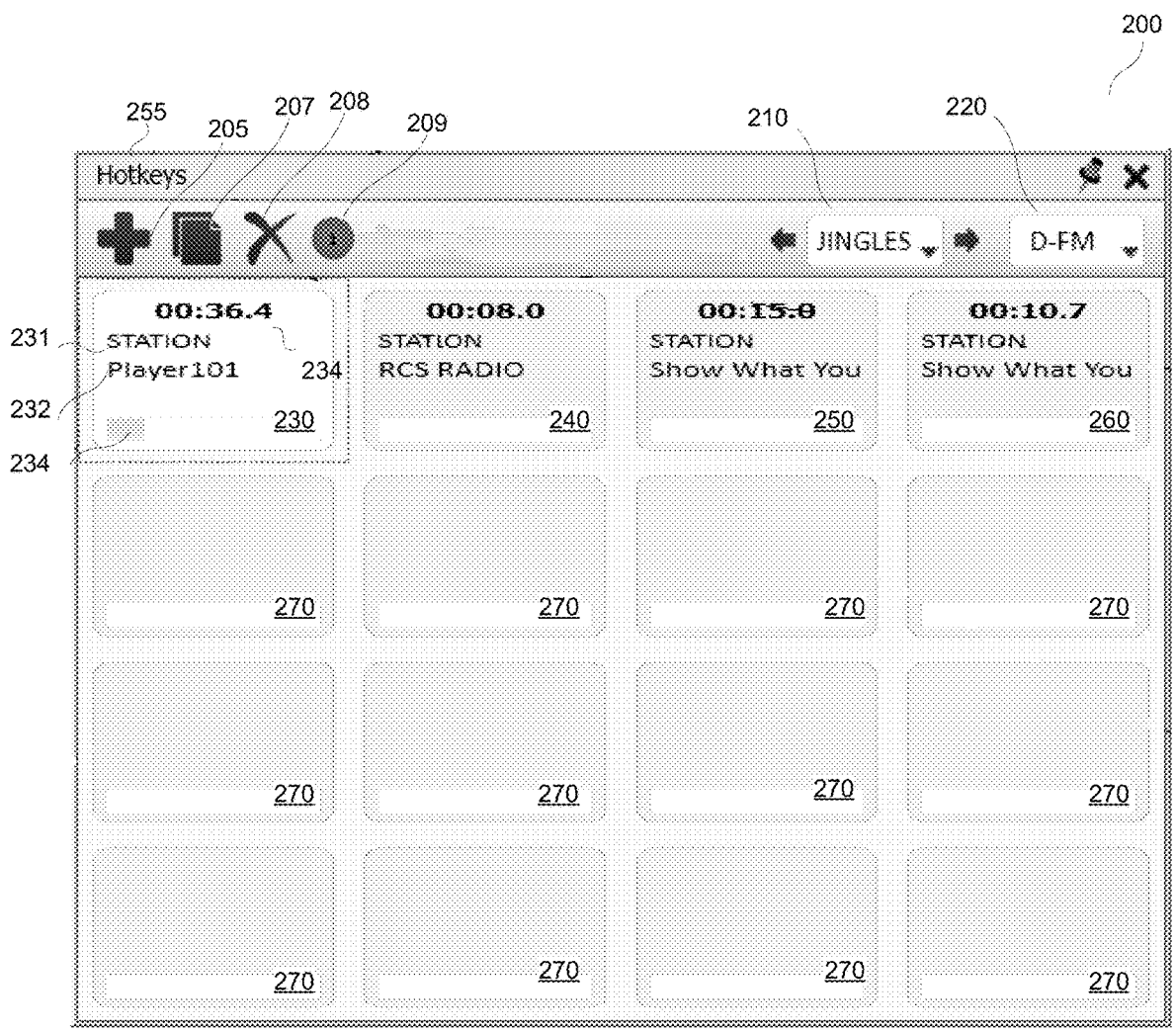
FIG. 2 depicts a Hotkey display region according to various embodiments of the present disclosure.

Referring next to FIG. 2, a Hotkeys region 200 will be discussed according to various embodiments of the present disclosure. Hotkeys region 200 includes a region identifier 255, which displays the name of Hotkeys region 200. Hotkeys region 200 also includes multiple hotkeys 230, 240, 250, 260, and 270, which can be configured to display information indicating their purpose or function. For example, hotkey 230 is configured to play a jingle when selected, and includes the length of 224 of the jingle, an author 231 of the jingle, a title 232 of the jingle, and a progress indicator 234. In some embodiments, hotkeys 270 display blank information fields, because they are unassigned.

Hotkeys 230, 240, 250, 260, and 270 can be used to insert a media item into a media stream currently being broadcast, or perform some other desired action. In some embodiments, selection of a hotkey will cause whatever media content is currently being aired to be stopped, at least temporarily, and cause a media item associated with the selected hotkey to be broadcast. In some such embodiments, when the media item associated with the selected hotkey is done being played, the media item can then be restarted, or the next media item to be played can be started in its stead. In other embodiments, selecting a particular hotkey can cause a media item associated with that hotkey to be overlaid onto a currently broadcast item, so that the media item currently being aired is not stopped, but continues to be aired while the media item associated with the hotkey is also aired at the same time the regularly scheduled media item is being broadcast. In at least one embodiment a user can, at any time, select one of the displayed hotkeys displayed and the media item associated with that hotkey will be broadcast, without having to insert that media item into the station log for scheduling.

Hotkeys region 200 also includes a Bank selector 210, which can be implemented as a dropdown menu to select a bank hotkeys displayed, and a Station selector 220, which can be implemented as a dropdown menu used to select a station with which Hotkeys region 200 is associated. Any particular selected station can have multiple different banks of hotkeys available for display. Thus, the availability of Bank selector 210 and Station selector 220 provide a wide range of possible display options. Assume, for example, that there are four possible stations that can be selected using Station selector 220. If each available station has four different hotkey banks available for selection, there are sixteen different possible hotkey banks that could be displayed in Hotkey region 200.

Hotkey display region 200 can also include user selectable objects 205, 207, 208, and 209. Add icon 205 is illustrated in the form of a "plus" shaped icon, and can be used to display additional hotkeys. In some embodiments, selection of user selectable icon 205 will bring up a menu or another window, (not illustrated), that can be used to set the parameters of particular hotkeys displayed within hotkey display region 200. Copy icon 207 is illustrated in the shape of multiple printed pages, and can be used to copy a hotkey bank. Delete icon 208, which in the illustrated embodiment takes the form of a stylized "X," can be used to delete one or more hotkeys 230, 240, 250, 260. Stream Availability indicator 209 displays the current number of available streams.

Figure 3:
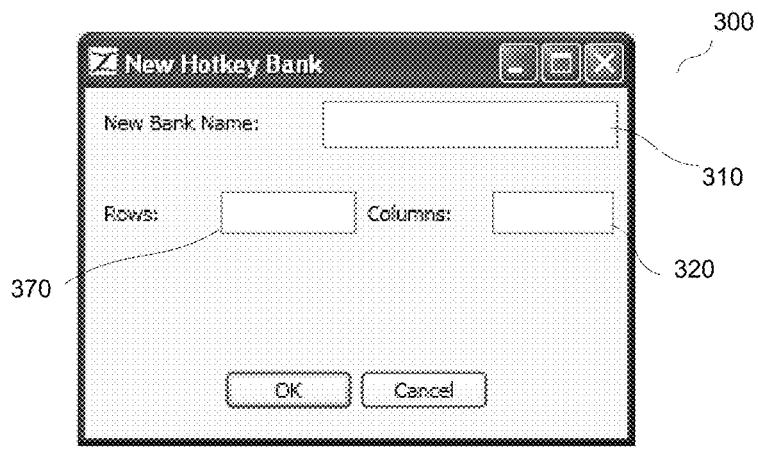
FIG. 3 shows a Hotkey Bank configuration region according to various embodiments of the present disclosure.

Referring next to FIG. 3, a Hotkey Bank configuration region 300 will be discussed according to various embodiments of the present disclosure. Hotkey Bank configuration region 300 provides a user with the ability to configure additional collections of hotkeys for display within a Hotkeys region 200 (FIG. 2). Hockey Bank configuration region 300 includes a New Bank Name fillable area 310, a Rows fillable area 370 and a Columns fillable area 320. New Bank Name fillable area 310 is provided for input of a name or other identifier to be used for the new hotkey bank. For example, the hotkey bank displayed in FIG. 2 is named "Jingles." Row fillable area 370 and Column fillable area 320 can be used to designate the number of rows and columns to display on a particular hotkey page. For example, the Jingles hotkey area shown in FIG. 2 is configured to display the hotkeys in a matrix of 4 rows and 4 columns.

Figure 4:
FIG. 4 is a diagram illustrating a Library display region according to embodiments of the present disclosure.

Referring next to FIG. 4, a Library region 400 is illustrated according to various embodiments of the present disclosure. Library region 400 displays various user selectable objects, and information associated with a media library of a selected station, which can be selected using Station selector 420. In some embodiments, the information includes title, artist, category, and duration. The information can also include other information, such as an album title, a media file name, a start date and time at which a particular media item will be available for play, a stop date and time at which the media will no longer be available to be played, a kill date that specifies when a song will be automatically deleted from the library, and a version of the song. In at least some embodiments, the information displayed in Library region 400 includes information associated with a media stream currently being broadcast.

The particular information displayed within Library region 400 can be varied by interacting with displayed user selectable objects, which include media tab 430, spots tab 440, or links tab 450. The illustrated example shows, for each media item, title 432, artist 434, a duration 436, and a file location 438. In some embodiments, one or more of the sections of item 432 is selectable, to allow the media item to be sent to a particular Internet address. Media tab 430, spots tab 440, and links tab 450 can be selected to sort the displayed information by media type. The displayed information can also be sorted by column, and columns can be added or deleted from the display as desired.

Other user selectable objects displayed in Library region 400 can include Add icon 462, Refresh icon 464, Delete icon 466, and Speaker icon 468. Add icon 462 can be used to add new media events to Library region 400. In at least some embodiments, songs and other media can be imported directly to the library associated with Library region 400, without requiring special processing to convert the added media into a specialized format. Selecting Add Icon 462 can initiate display of additional windows or user selectable objects to facilitate entering information about the media to be added. In some embodiments, prior to adding a media item to the library, a check is performed to determine whether or not the item is already included in the library.

Refresh icon 464 can be used to refresh the information displayed in Library region 400; delete icon 466 can be used to remove items from Library region 400; and speaker icon 468 can be used to audition, or audibly preview, a selected song or other media file.

Referring next to FIG. 5, a Logs region 500 is illustrated according to various embodiments of the present disclosure. Logs region 500 can be used to display information related to a media schedule for a selected station on a selected date. Logs region 500 can be used to display a listing of songs and other media items that have been broadcast, are currently being broadcast, or are scheduled to be broadcast. In addition, various play controls and status indicators can be provided to allow a user to manage and control the playback of various media items.

In various embodiments, Logs region 500 includes a refresh icon 502 to force a refresh of the information displayed in Logs region 500. Typically, however, the log screen is kept up to date in real time, including up to date display of the schedule made elsewhere in the system, even if changes are being made on other machines on the network. In some embodiments, refresh icon 502 is provided in addition to an automatic periodic or aperiodic refreshing of the displayed information. A delete icon 504 can be provided to remove, or mark to skip, media assets from the log, a home icon 506 which can be used to allow a user to move the view and cursor to a currently hidden portion of the screen, and a speaker icon 508 which can be used to send a selected song to an audio output. Segue icon 510, can also be provided, and can be used to invoke the Segue Editor. Microphone icon 512 can be used to enter the VoiceTracker module for the purpose of recording announcements prior to air time.

Logs region 500 also includes a date indicator 522 and Station selector 520, which can be used to select a station, play stream, or media stream for which to display information. In the illustrated example, station D-FM has been selected, and the media titles displayed in Log region 500 are each associated with a media stream being broadcast on selected station D-FM. The information displayed in Log region 500 can include a list of media items and associated play controls, with the play controls being displayed in close proximity to the respective media items with which they are associated.

In the illustrated example of FIG. 5, information associated with station D-FM has been selected for display by using Station selector 520. The list of media titles shown in FIG. 5 has been sorted in time order, so that the earliest time is towards the top of the region. The first media title shown is Meeting Across the River, which aired at 2:56 pm. As shown by status indicator 540, Meeting Across the River indicates that the song has already been played.

The next song down, Move Over, began playing at 2:59:19, and as indicated by both progress indicator 565 and status indicator 530, is currently being played. Segue Type indicators 532 indicate that the song Move Over is configured to segue into the next scheduled song, Born to be Wild, upon completion. Status indicator 550 is displayed next to songs that have not yet been played out. In other embodiments, the type of segue could be an octagon to resemble a stop sign, indicating that the event should not transition into the next item but rather stop waiting for user action. In the case of media type Links into and out of songs, the Segue Type can be "Link-Song" 585 or "Auto Post" (not illustrated), which have their own default behaviors as it relates to the song that is adjacent to the Link. Link Song will start playing the Link no sooner than an Early Segue Marker, and be mindful of the Intro Post value of a song that follows the Link such that the end of the Link will not play past the Intro Post. Auto Post will start the Link such that the end of the Link will coincide with the position of the Intro Post of the following song, even if that means starting after the "following" song has begun. The user may elect to change the default behavior from one type of Segue Type to another for an instance of a media event in the log, which is done by selecting the icon and choosing a different type in the list.

The lack of a checkmark, "X," or other indicator in checkbox 534 indicates that the song Move Over is not to be skipped. If a user decides that any of the media items should be skipped, he can simply click the checkbox corresponding to that item. A mark can be displayed in the checkbox, and the song will be removed from the media stream.

Note the last entry at time 3:25:03 PM; which is referred to as exact time marker 587, which can be used to help a user stay on a schedule. Exact time marker 587 can also be used in calculating displays in other screens or display areas, as discuss subsequently with respect to FIG. 6.

In the illustrated embodiment, the status indicators and play controls are displayed in close proximity the media item with which they are associated. In the illustrated example, the indicators and controls are positioned in line with their associated media item identifiers. However, the play controls and indicators can be displayed in other positions relative to their associated media item identifiers, as long as they are positioned close enough to enable a user to identify the association between the controls and indicators and their respective media item identifiers.

The remaining song titles are scheduled to be played at the times indicated in the Airtime column, and in the order indicated. In some embodiments, as each of the song titles displayed begins to play, its status indicator will change to a right-handed triangle similar to status indicator 530. After a song has been played, its status changes to a checkmark or other suitable indicator similar to status indicator 540. If an item is skipped, or terminated early, the status icon can also indicate those conditions.

Also displayed in the illustrated example of Logs region 500 are a series of numbers from 0 to 23, running horizontally across the region 500 just above the list of media titles. The list of numbers includes an indicator 518 that shows, in military time, the current hour. In other embodiments, different time indicators can be used. Pressing any of the numbers causes the GUI to track to that section of the log, as well as change the Home icon's state to indicate that the user is no longer tracking current position.

Figure 6:
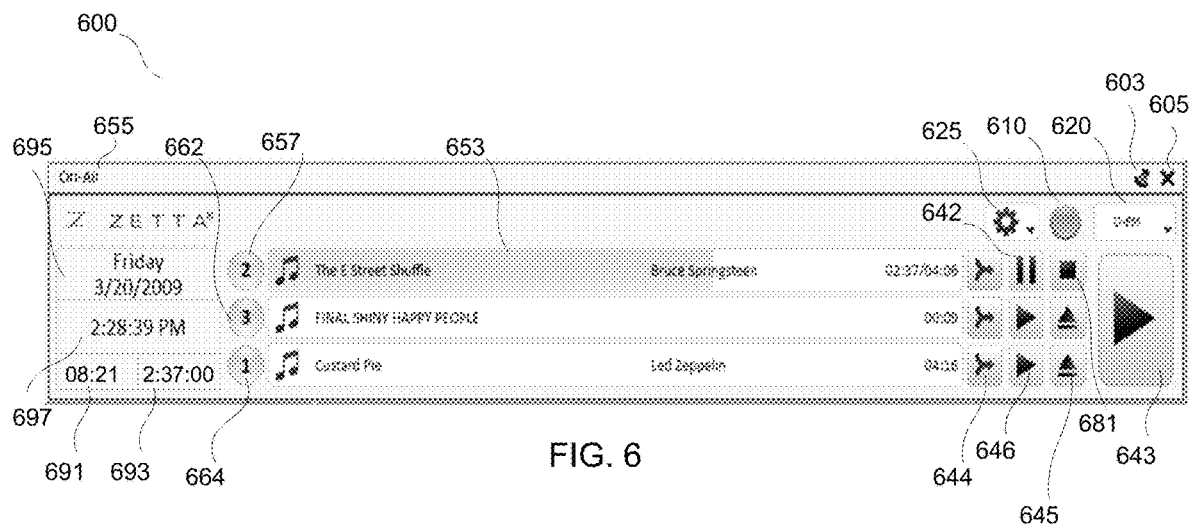
FIG. 6 is a diagram illustrating an On-Air display region according to embodiments of the present disclosure.

Referring next to FIG. 6, an On-Air region 600 is discussed according to various embodiments of the present disclosure. On-Air region 600 can be used in some embodiments to control playback of media in "current section" of the Logs region 500. The illustrated example of an On-Air display region 600 includes a region identifier 655, Add to Layout icon 603, and a close button 605. Add to Layout Icon 603, as commonly known the art, is used to add On-Air regions 600 particular screen location to the current layout, after On-Air region 600 has been positioned as desired by a user. Close button 605 is also known in the art, and can be selected to cause On-Air region 600 to stop being displayed. The non-display has no bearing on functionality. The system will continue to operate whether the GUI is running or not.

On-Air region 600 can be configured to display information associated with a selected station or play stream by using Station selector 620. In various embodiments, On-Air display region 600 can be used to select among various different stations or play streams, and the information displayed can change as different stations are selected using Station selector 620. On-air indicator 610 displays the on-air/off-air status of station D-FM.

Next to On-Air indicator 610, a Mode selector 625 is displayed. In some embodiments, Mode selector 625 is used to allow a user to select between various playback modes. In some embodiments, 3 different playback modes can be selected: 1) manual; 2) automatic; and 3) Live Assist. Other embodiments may also include "Split" and "Satellite" modes.

On-Air region 600 can also include channel indicators 642, 644, and 657. In some embodiments, a song is assigned to a channel, which is then indicated in 657 for example. The information that is displayed as a part of a channel assignment is in the configuration of the associated play device in the Player. The channel assignment occurs when it is first displayed in On-Air region 600. It should be noted that in the illustrated embodiment, a channel indicator of "1" does not necessarily mean that it is the first song in the queue, because the channel indicators 642, 644, and 657 remain with a particular media item once the media until after that media item has been played.

In the illustrated example, The E Street Shuffle is currently being played, as indicated by progress indicator 653. In operation, progress indicator 653 can be displayed as a semi-transparent bar of color that progressively highlights a rectangular from left to right until an associated media title has been completely played, or otherwise ends. Various other progress indicators known to those skilled in the art can also be used.

Final Shiny Happy People is the next song to be played, and Custard Pie is in line to be played after that. In some embodiments, the songs are played in the order in which they are displayed, and the channel indicators operate in a round-robin fashion. Thus, when The E Street Shuffle has finished playing, it will fall off the list, and Final Shiny Happy People and Custard Pie will each move up list. The channel indicator 662 will remain next to Final Shiny Happy People, and channel indicator 664 will remain next to Custard Pie. The next media item to be played will fill in the bottom of the list, and will be assigned channel indicator 657. The channel indicators 662, 664, and 657 will continue to rotate in round-robin fashion with the completion of one song and addition of another. In other embodiments, channel indicator number can be configured to change, so that a channel indicator showing the number "1" will remain next to the first song to be played, a channel indicator showing "2" will remain next to the second song, and so on. Furthermore, letters or colors can be used in place of or in addition to numbers. Additional channel indicators can be used consistent with the number of media items displayed in any particular instance of On-Air region 600, or the use of channel indicators can be foregone if desired.

In addition to displaying a list of songs or media items to be broadcast, play controls associated with each of the items of information can also be displayed in close proximity to media identifiers with which they are associated. For example, pause button 642 can be used to pause playback of The E Street Shuffle, and stop button 681 can be used to stop or cancel playback of the same media item. Play button 646 can be used to start playing back Custard Pie, and eject button 645 can be used to take Custard Pie out of the playback sequence. Segue Type 644 is identical to Segue Type referenced in the Logs 500 section, and displays whether Custard Pie is to automatically segue into the next scheduled song, or stop as examples. Similar indicators and controls in close proximity to other media identifiers have similar functions, except that those functions are with respect to the media identifiers with which the play controls and indicators are associated. In addition to controls for individual media items, a master-play button 643 can be used in automatic mode to start an automatic play sequence. In some embodiments, master-play button 643 is used to start playing the next queued event, regardless of whether the previous event has finished playing.

In various embodiments, some or all of the play controls 643, 644, 645, and 646, as can have different functions based on the selected mode. For example, if automatic mode is selected by Mode selector 625, media items may be broadcast without need of user intervention. In some embodiments, some or all of the individual play controls may be disabled in automatic mod, while all or substantially all individual play controls can be enabled. In various embodiments, when operating in a live assist mode, the individual play controls can be used to control whether the next event is automatically started, or whether playback of the next event should wait for manual intervention.

Various timing and schedule assist indications can also be displayed in On-Air region 600. For example, the current day and date 695 can be displayed, as can the current time 697. In some cases, over/under timer 691 and an exact time marker 693 can also be displayed. Over/under timer 691 can be used to display a time difference between the exact time marker 693 and the current time 697. A positive number can be used to indicate that more media content is scheduled than is needed to reach the exact time marker 693, while a negative number can be used to indicate the converse. In some embodiments, a color or other attention-drawing indicator can be used to emphasize whether a user is over or under the exact time marker 693.

Figure 7:
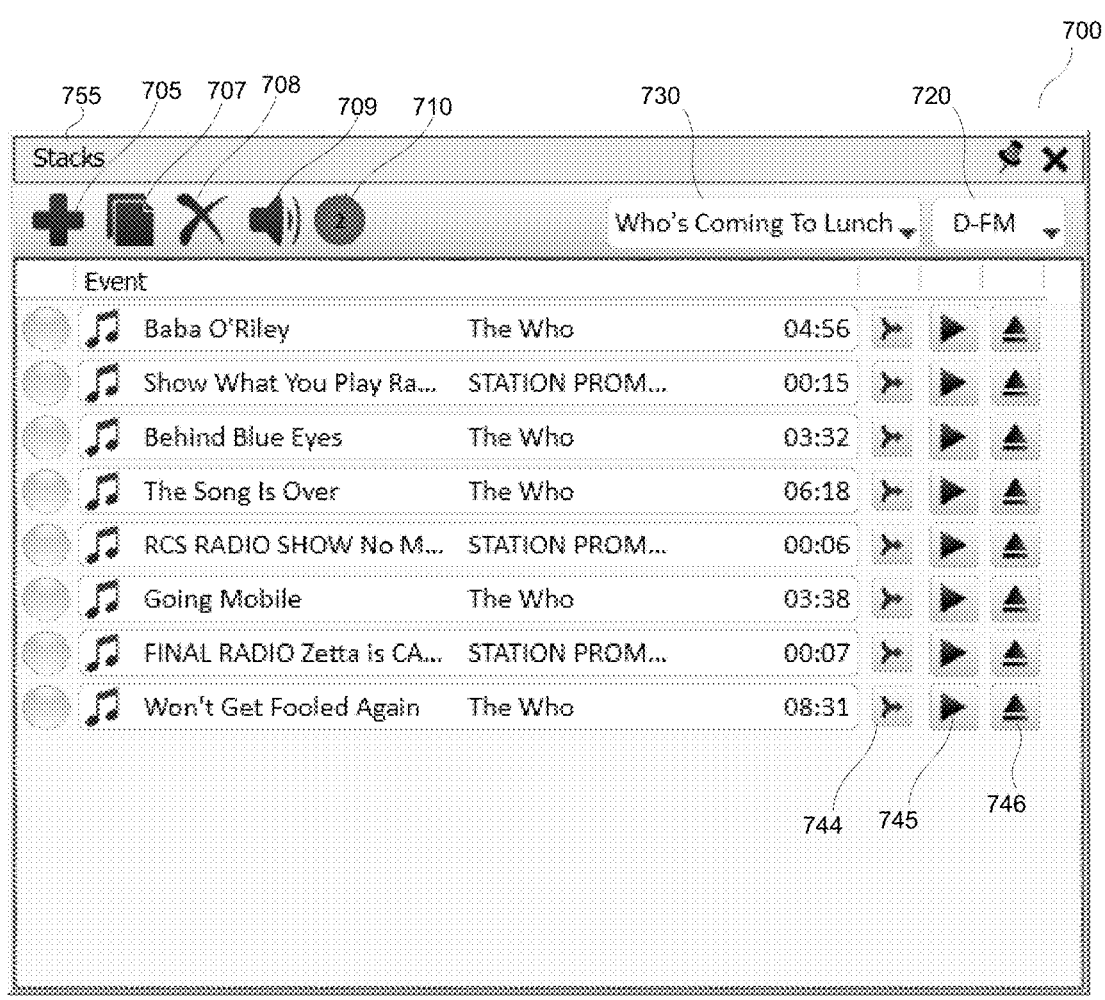
FIG. 7 is a diagram illustrating a Stacks display region according to embodiments of the present disclosure.

Referring next to FIG. 7, a Stacks region 700 as illustrated according to various embodiments of the present disclosure. The stacks display region is used to display a collection of media items to be broadcast. Stacks region 700 includes a display region identifier 755, Add icon 705, Copy icon 707, Delete icon 708, Speaker icon 709, and a Stream indicator 710. Stacks display region 700 also includes a Stack selector 730 for choosing which stack to display, and Station selector 720. Stacks display region 700 displays a list of media identifiers and associated play controls play controls, which can include eject button 746 to permit a particular event to be taken out of the playback sequence, play button 745 to cause a particular event to be immediately played, and handling indication 744 to indicate whether an event is to automatically segue into the next event, whether the event is to be skipped, whether the event has been stopped, or the like.

Figure 8:
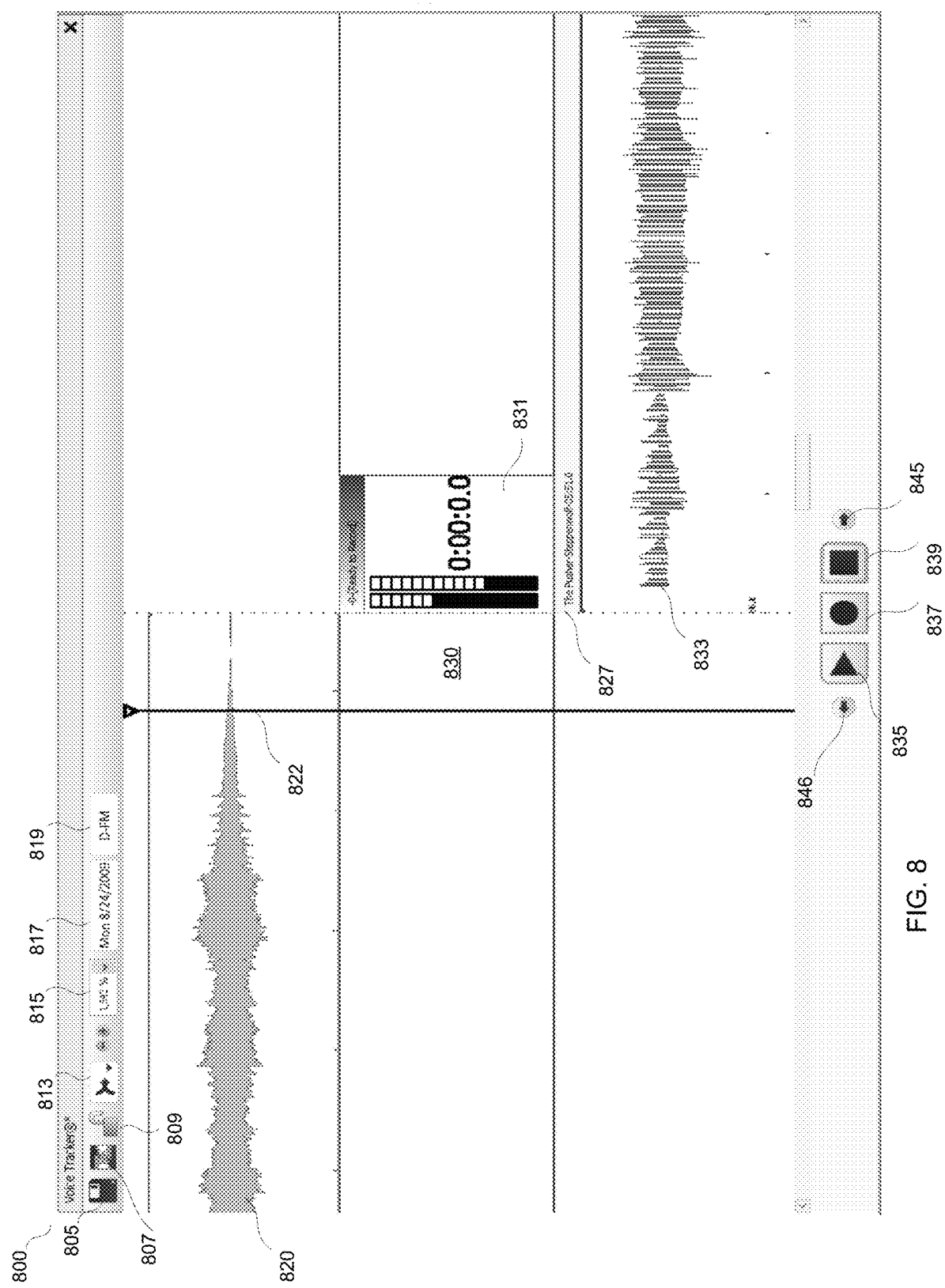
FIG. 8 is a diagram illustrating a display region that can be used to set a fade point in a media item according to various embodiments of the present disclosure.

Referring next to FIG. 8, a Segue Tool is illustrated according to various embodiments of the present disclosure. Segue Tool 800 allows a user to view and manipulate a visual indication related to the timing relationship between media assets represented as item 820 and 833, and in the embodiment shown, record a Voice Track item into the middle track 830. The user also has the ability to add a fade out event at any point in the timeline of item 820, or a fade in on item 833, by placing cursor 822 at a desired location and using the right mouse button and choosing the Fade in or Fade out Option. Additionally, the user can "add volume point" which adds a point at the current location of cursor 822, which the user can move up and down to affect the audio level 829 of the selected item. Other methods of adding a fade events and volume points can be implemented without departing from the spirit and scope of the present disclosure.

To record a voice track into the timeline, the user can press the record button 837, which in at least one embodiment activates a recording process and initiates a count up of time since the button has been pressed, as shown in item 831. Note that a media asset displayed in "Track 3" 833 can be identified by metadata 827 pertaining to a displayed media asset.

A typical workflow for some embodiments would be to press the play button 835, which causes "Track 1" item 820 to start playing through an assigned player. Pressing record 837 would cause the recording of the voice track to occur. Or the user might choose to press the play button 835 again, which would cause "Track 3" 833 to play, in which case the user could start recording the Voice Track, 830 by pressing the record button 837. In either event, pressing the record button 837 while recording can cause the recording to cease, leaving any other playing items to continue to play out. Pressing stop button 839 can cause all recording and playback to cease. Once the recording has completed, the "Track Lock" icon 809 would change to a Locked graphic, allowing the user to listen to the entire sequence of events by pressing the play button 835.

Pressing the Save button 805 can, in some embodiments, cause changes made in the Segue Tool to be saved to a database, indicating how the sequence of events should play back.

In some embodiments of the Segue Tool, instead of a Voice Track as shown in FIG. 8, the second track 830 can display a whole media asset, from beginning to end, shown as it would play back in the On Air Screen in relationship to its surrounding events. The information displayed in the second track 830 is, in some embodiments, based on a display mode in which the Segue Tool is operating. The mode of the Segue Tool can be determined based on whether a user calls the Segue Tool by selecting a Voice Track from the Logs screen 500, or by choosing the Segue icon from the Logs Screen 500. Once the Segue Tool is in operation, a user can change the mode by selecting Segue button 807, which in some embodiments toggles to a microphone Icon if a user is already in Segue Tool mode.

The Segue Tool can also be equipped with Previous button 846 and Next button 845. When in Segue Tool mode, the Previous button 846 brings the user back one step in the log, by moving track 1 to track 2, track 2 to track 3 and the item in the log that precedes track 1 in the log to track 1. The Next button 845 moves the item in track 2 to track 1, track 3 to track 2 and the item after track 3 in the log to track 3. In both cases a save event, similar to what happens when pressing save button 805, can occur.

The Segue Type control 813 can be used to change the type of segue, in a manner similar to corresponding controls included in the Log screen 500 and On air screen 600.

In the Segue Tool the user has access to Zoom controls 815, where segments of the segue display can be scrutinized visually by using zoom in or changing the magnification control to a higher number. The user can also zoom out of a segue display to the point that is 100%, representing the zoom at which the user came into the tool. Date indicator 817 and Station selector 819, which function in a manner similar to date indicator 522 (FIG. 5) and Station selector 520 (FIG. 5).

Figure 9:
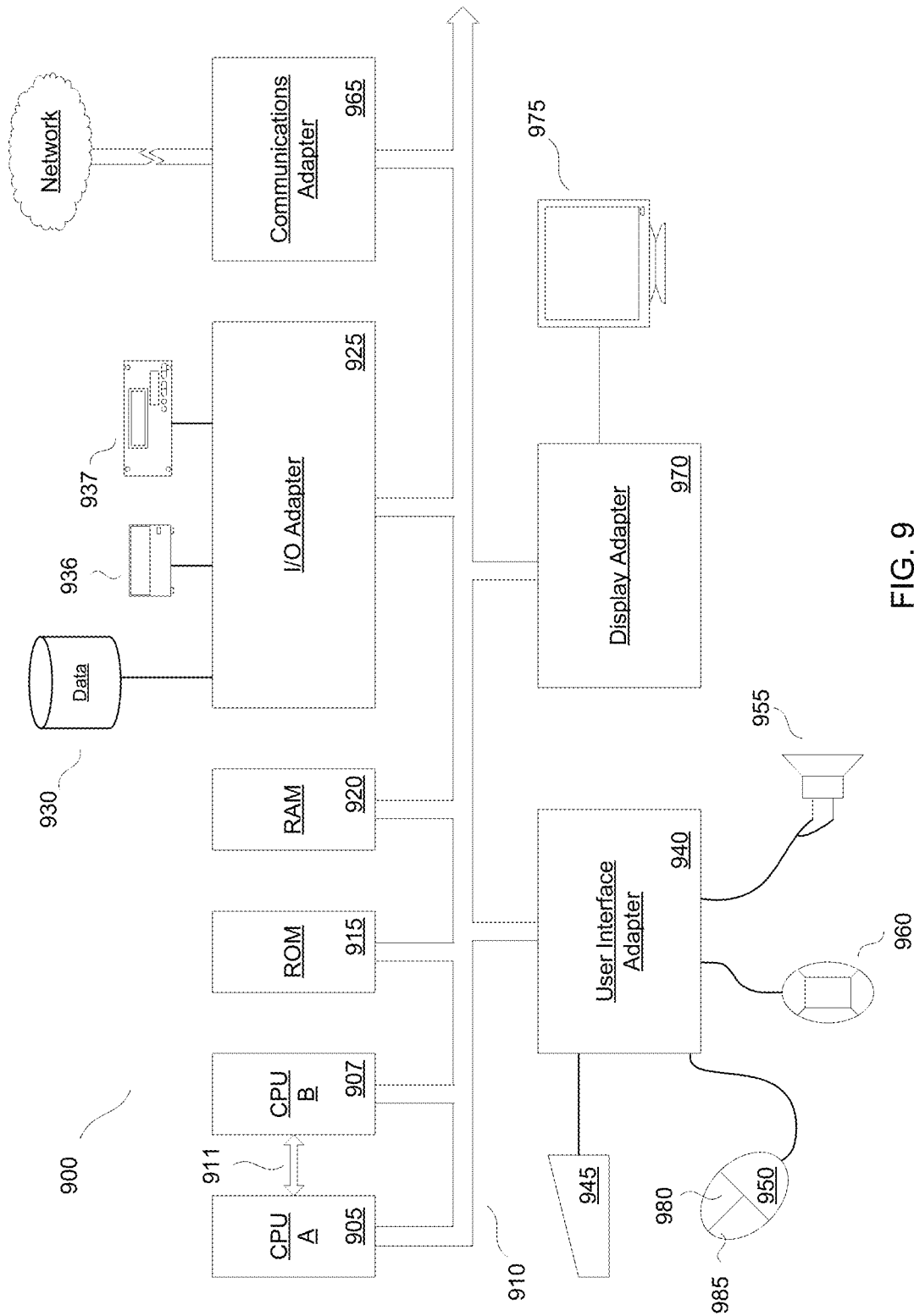
FIG. 9 is a high-level block diagram of a processing system according to an embodiment of the present disclosure.

Some or all of the methods and processes described herein can be embodied in or performed by one or more processing systems. An example of such a processing system is discussed with reference to FIG. 9. Processing system 900 includes one or more processors such as CPU A 905 and CPU B 907 connected to each other via communications path 911, random access memory (RAM) 920; read-only memory (ROM) 915, wherein the ROM 915 could also be erasable programmable read-only memory (EPROM) or electrically erasable programmable read-only memory (EEPROM); and input/output (I/O) adapter 925, for connecting peripheral devices such as disk units 930, optical drive 936, or tape drive 937 to system bus 910; a user interface adapter 940 for connecting keyboard 945, mouse 950, speaker 955, microphone 960, or other user interface devices to system bus 910; communications adapter 965 for connecting processing system 900 to an information network such as the Internet or any of various local area networks, wide area networks, telephone networks, or the like; and display adapter 970 for connecting system bus 910 to a display device such as monitor 975. Mouse 950 has a series of buttons 980, 985 and may be used to control a cursor shown on monitor 975.

It will be understood that processing system 900 may include other suitable data processing systems without departing from the scope of the present disclosure. For example, processing system 900 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various embodiments of a Graphical User Interface for use with broadcast automation software have been described in sufficient detail to allow those of ordinary skill in the art to practice the teachings set forth herein. Other variations and modifications of the embodiments disclosed may be made based on the description provided, without departing from the scope of the invention as set forth in the following claims.

What is claimed is:

1. A system for implementing a Graphical User Interface (GUI) for use with broadcast automation software, comprising:
    at least one processor;
    a display device;
    memory coupled to said at least one processor, said memory storing a program of instructions configured to be executed by said at least one processor to implement a GUI, the GUI comprising a plurality of display regions, on the display device, including at least one On-Air display region configurable to display information associated with a plurality of different media streams being currently aired on a respective one of a plurality of different media stations, the On-Air display region displaying a plurality of sub-regions including:
        a first sub region configured to receive stream-selection user input indicating a selected media stream of the plurality of different media streams being currently aired, wherein each sub-region of the On-Air display region displays information corresponding to the selected media stream, and wherein information from a first media stream being aired at the same time as a second media stream is displayed in the On-Air display region when the first media stream is selected, and information from the second media stream is displayed in the same On-Air display region when the second media stream is selected with user input;
        a second sub-region displaying an ordered arrangement of a plurality of media assets with a respective channel indicator scheduled for playback on the selected media stream;
        a plurality of sets of playback controls comprising at least a play button, an eject button, and a segue button for indicating serge type whether the selected media stream is to automatically segue into the next scheduled song or stop, each set of playback controls being displayed proximate to each of the plurality of media assets displayed in the second sub-region, and each set of playback controls providing the same functionality for different ones of the plurality of media assets displayed in the second sub-region; and
        a third sub-region displaying a mode selector configured to respond to user input by placing the On-Air display region into a selected mode, wherein the selected mode is selected from the group consisting of: a manual mode, an automatic mode, and a live assist mode, and some or all of the playback controls in the second sub-region assign different functionality based on the selected mode.

2. The system of claim 1, wherein the GUI further comprises:
    a Hotkeys display region configured to display user-configurable hotkeys.

3. The system of claim 2, wherein at least one of the user-configurable hotkeys displayed in the Hotkeys display region is configured to respond to user input by inserting a media item into one of the plurality of different media streams.

4. The system of claim 2, wherein the Hotkeys display region includes a Station selector configured to receive stream-selection input indicating a selected media stream of the plurality of different media streams, wherein the Hotkeys display region displays information corresponding to the selected media stream.

5. The system of claim 1, wherein the plurality of display regions includes:
    a second On-Air display region including:
    another first sub-region;
    another second-sub region;
    another plurality of sets of playback controls; and
    wherein the first sub-region and the another first sub region indicate different selected media streams.

6. A non-transitory computer readable medium tangibly embodying a program of instructions executable to implement a Graphical User Interface (GUI) for use with broadcast automation software, the program of instructions comprising:
    at least one instruction configured to display a plurality of display regions, on a display device, including at least one On-Air display region configurable to display information associated with a plurality of different media streams being contemporaneously aired on a respective one of a plurality of different media stations;
    at least one instruction to display a plurality of sub-regions in the On-Air display region, the plurality of sub-regions including:
        a first sub region configured to receive stream-selection user input indicating a selected media stream of the plurality of different media streams being contemporaneously aired, wherein each sub-region of the On-Air display region displays information corresponding to the selected media stream, and wherein information from a first media stream being aired at the same time as a second media stream is displayed in the On-Air display region when the first media stream is selected, and information from the second media stream is displayed in the same On-Air display region when the second media stream is selected with user input;
        a second sub-region displaying an ordered arrangement of a plurality of media assets with a respective channel indicator scheduled for playback on the selected media stream;

a plurality of sets of playback controls comprising at least a play button, an eject button, and a segue button for indicating serge type whether the selected media stream is to automatically segue into the next scheduled song or stop, each set of playback controls being displayed proximate to each of the plurality of media assets displayed in the second sub-region, and each set of playback controls providing the same functionality for different ones of the plurality of media assets displayed in the second sub-region; and a third sub-region displaying a mode selector configured to respond to user input by placing the On-Air display region into a selected mode, wherein the selected mode is selected from the group consisting of: a manual mode, an automatic mode, and a live assist mode, and some or all of the playback controls in the second sub-region assign different functionality based on the selected mode.

7. The non-transitory computer readable medium of claim 6, further comprising:
at least one instruction configured to display a Hotkeys display region including user-configurable hotkeys.

8. The non-transitory computer readable medium of claim 7, further comprising:
at least one instruction configured to respond to user input received via at least one of the user-configurable hotkeys by causing a media item associated with the at least one of the user-configurable hotkeys to be overlaid onto a currently broadcast media item, so that airing of the currently broadcast media item is not stopped, but continues while the media item associated with the at least one of the user-configurable hotkeys is also aired at the same time.

9. The non-transitory computer readable medium of claim 7, wherein the at least one instruction configured to display the Hotkeys display region includes:
at least one instruction configured to display a Station Selector, the Station Selector configured to receive stream-selection input indicating a selected media stream of the plurality of different media streams; and
at least one instruction to display information corresponding to the selected media stream in the Hotkeys display region.

10. The non-transitory computer readable medium of claim 6, further comprising:
at least one instruction to display a second On-Air display region including:
another first sub-region; another second-sub region; another plurality of sets of playback controls; and
wherein the first sub-region and the another first sub region indicate different selected media streams.

11. A method of implementing a Graphical User Interface (GUI) for use with broadcast automation software, the method comprising:
displaying a plurality of display regions, on a display device, including at least one On-Air display region configurable to display information and playback controls associated with a plurality of different media streams being currently aired on a respective one of a plurality of different media stations;

displaying a plurality of sub-regions in the On-Air display region, the plurality of sub-regions including:
a first sub region configured to receive stream-selection user input indicating a selected media stream of the plurality of different media streams being currently aired, wherein each sub-region of the On-Air display region displays information corresponding to the selected media stream, and wherein information from a first media stream being aired at the same time as a second media stream is displayed in the On-Air display region when the first media stream is selected, and information from the second media stream is displayed in the same On-Air display region when the second media stream is selected with user input;
a second sub-region displaying an ordered arrangement of a plurality of media assets with a respective channel indicator scheduled for playback on the selected media stream;
a plurality of sets of playback controls comprising at least a play button, an elect button, and a segue button for indicating serge type whether the selected media stream is to automatically segue into the next scheduled song or stop, each set of playback controls being displayed proximate to each of the plurality of media assets displayed in the second sub-region, and each set of playback controls providing the same functionality for different ones of the plurality of media assets displayed in the second sub-region; and
a third sub-region displaying a mode selector configured to respond to user input by placing the On-Air display region into a selected mode, wherein the selected mode is selected from the group consisting of: a manual mode, an automatic mode, and a live assist mode, and some or all of the playback controls in the second sub-region assign different functionality based on the selected mode.

12. The method of claim 11, further comprising:
displaying a Hotkeys display region including user-configurable hotkeys.

13. The method of claim 12, further comprising:
responding to user input received via at least one of the user-configurable hotkeys by inserting a media item associated with the at least one of the user-configurable hotkeys into a broadcast, without also inserting the media item into a station log for scheduling.

14. The method of claim 12, wherein displaying the Hotkeys display region includes:
displaying a Station Selector, the Station Selector configured to receive stream-selection input indicating a selected media stream of the plurality of different media streams; and
displaying information corresponding to the selected media stream in the Hotkeys display region.

15. The method of claim 11, further comprising:
displaying a second On-Air display region including:
another first sub-region; another second-sub region; another plurality of sets of playback controls; and
wherein the first sub-region and the another first sub region indicate different selected media streams.

* * * * *